United States Patent
Ho

(10) Patent No.: US 11,181,224 B2
(45) Date of Patent: Nov. 23, 2021

(54) POSITIONING CARRIER FOR VERTICAL RAIL

(71) Applicant: Oxti Corporation, Taipei (TW)

(72) Inventor: Chih Feng Ho, Taipei (TW)

(73) Assignee: OXTI CORPORATION, Taipei (TW)

( * ) Notice: Subject to any disclaimer, the term of this patent is extended or adjusted under 35 U.S.C. 154(b) by 98 days.

(21) Appl. No.: 16/808,501

(22) Filed: Mar. 4, 2020

(65) Prior Publication Data

US 2021/0278029 A1   Sep. 9, 2021

(51) Int. Cl.
| | | |
|---|---|---|
| *F16M 11/00* | (2006.01) | |
| *F16M 11/04* | (2006.01) | |
| *F16M 13/02* | (2006.01) | |

(52) U.S. Cl.
CPC ......... *F16M 11/041* (2013.01); *F16M 11/046* (2013.01); *F16M 13/022* (2013.01); *F16M 2200/027* (2013.01)

(58) Field of Classification Search
CPC .... F16M 11/046; F16M 13/022; F16M 11/00; F16M 11/24; F16B 37/045; F16B 37/046
See application file for complete search history.

(56) References Cited

U.S. PATENT DOCUMENTS

| | | | | |
|---|---|---|---|---|
| 4,021,973 A | * | 5/1977 | Hegg .................... | A47G 5/00 52/36.6 |
| 4,355,793 A | | 10/1982 | Juneau | |
| 4,388,786 A | * | 6/1983 | Gassier ................. | E04B 2/744 52/238.1 |
| 4,805,365 A | * | 2/1989 | Bastian ................. | E04B 2/744 52/282.2 |
| 5,240,089 A | * | 8/1993 | Spera ..................... | E04G 7/26 182/186.7 |
| 5,315,805 A | * | 5/1994 | Harsch .................. | E04B 2/744 403/170 |
| 5,683,197 A | * | 11/1997 | Pihl ...................... | F16B 7/0466 403/170 |
| 6,119,317 A | * | 9/2000 | Pfister .................. | F16M 11/24 24/514 |
| 6,315,260 B1 | | 11/2001 | Lees | |
| 6,322,277 B1 | * | 11/2001 | Jennings ............... | E04G 11/48 403/49 |
| 6,554,235 B1 | * | 4/2003 | Fortier ................. | A47B 57/565 248/122.1 |
| 6,599,055 B2 | * | 7/2003 | Auer ..................... | E04B 2/7427 403/381 |
| 10,393,163 B2 | * | 8/2019 | Ucgun ................ | A63B 21/4034 |

(Continued)

*Primary Examiner* — Amy J. Sterling
(74) *Attorney, Agent, or Firm* — Browdy and Neimark, PLLC

(57) ABSTRACT

A positioning carrier for attaching to a rail having a rib includes a housing having a bore, a frame attached to the housing and engaged onto the rail and having a compartment for receiving the rail, a bracket engaged into the frame and engaged with the rail, a seat attached to the housing and having a curved surface, a latch engaged through the frame and the housing and the seat, a shaft attached to the latch, a spring biasing member engaged onto the latch and engaged between the shaft and the seat, and a cam member engaged with the shaft and engaged with the curved surface of the seat for actuating the frame and the housing and the seat toward each other or for releasing the frame and the housing and the seat from each other.

9 Claims, 5 Drawing Sheets

(56) References Cited

U.S. PATENT DOCUMENTS

| | | | |
|---|---|---|---|
| 2004/0134331 A1* | 7/2004 | Hsieh | F16B 2/185 84/327 |
| 2014/0158843 A1* | 6/2014 | Murray | F16M 11/048 248/218.4 |
| 2017/0108760 A1* | 4/2017 | Achenbach | F16M 11/2014 |

* cited by examiner

POSITIONING CARRIER FOR VERTICAL RAIL

BACKGROUND OF THE INVENTION

1. Field of the Invention

The present invention relates to a positioning seat or clamp or carrier, and more particularly to a positioning clamp or carrier including an improved structure or configuration for solidly and stably attaching or mounting or securing or anchoring or retaining or positioning to a vertical track or rail at the selected or predetermined or required position or location easily and quickly.

2. Description of the Prior Art

Various kinds of typical positioning clamps or devices have been developed and provided for attaching or mounting or securing or anchoring or retaining or locking positioning to a vertical track or rail at the selected or predetermined or required position or location and comprise a screw or handgrip for operating or attaching the positioning clamps or devices to the vertical track or rail.

For example, U.S. Pat. No. 4,355,793 to Juneau, and U.S. Pat. No. 6,315,260 B1 to Lees disclose several of the typical positioning clamps or devices for attaching or mounting or securing to track or rail or the like and for supporting an object at selected or predetermined or required position or location.

However, the typical positioning clamps or devices normally include a complicated structure or configuration that may not be easily and quickly made or manufactured and that may not be easily and quickly actuated or operated by the users.

The present invention has arisen to mitigate and/or obviate the afore-described disadvantages of the conventional positioning carriers.

SUMMARY OF THE INVENTION

The primary objective of the present invention is to provide a positioning clamp or carrier including an improved structure or configuration for solidly and stably attaching or mounting or securing or anchoring or retaining or positioning to a vertical track or rail at the selected or predetermined or required position or location easily and quickly.

In accordance with one aspect of the invention, there is provided a positioning carrier for attaching to a rail having one or more ribs, the carrier comprises a housing which includes a bore formed in the housing, a frame attached to the housing, the frame being engaged onto the rib of the rail and to be moved up and down along or relative to the rail, the frame including a compartment formed in the frame for receiving and engaging with the rib of the rail, and the frame including a hole formed in the frame and aligned with the bore of the housing, a bracket engaged into the compartment of the frame and contacted and engaged with the rib of the rail, a seat attached to the housing, the seat including a passage formed in the seat and aligned with the hole of the frame and the bore of the housing, and the seat including a curved surface formed in the seat, a latch engaged through the hole of the frame and the bore of the housing and the passage of the seat, a shaft attached to the latch, a spring biasing member engaged onto the latch and engaged between the shaft and the seat, and a cam member including a groove formed in the cam member for receiving and engaging with the shaft and for contacting and engaging with the curved surface of the seat, and for actuating and forcing the frame and the housing and the seat toward each other in order to anchor and retain the frame and the housing to the rib of the rail when the cam member is rotated in one direction relative to the seat and the housing, and for releasing the frame and the housing and the seat from each other when the cam member is rotated in another direction relative to the seat and the housing and for allowing the frame and the housing to be easily and quickly attached or mounted or secured to and released from the rail.

The cam member includes a hand grip for actuating and rotating the cam member relative to the seat and the housing. The frame includes at least one flap engaged with the rib of the rail for anchoring the frame to the rib of the rail. The bracket includes at least one flange engaged with the rib of the rail for anchoring the bracket to the rib of the rail, in which the bracket includes an opening formed in the bracket for receiving and engaging with the latch.

The latch includes a threaded segment engaged with the shaft for detachably and adjustably secured to the shaft. The housing includes a chamber formed in the housing for receiving and engaging with the frame. The housing includes at least one peg engaged with the frame for anchoring the frame to the housing. The bracket includes at least one stud engaged with the housing for anchoring the bracket to the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
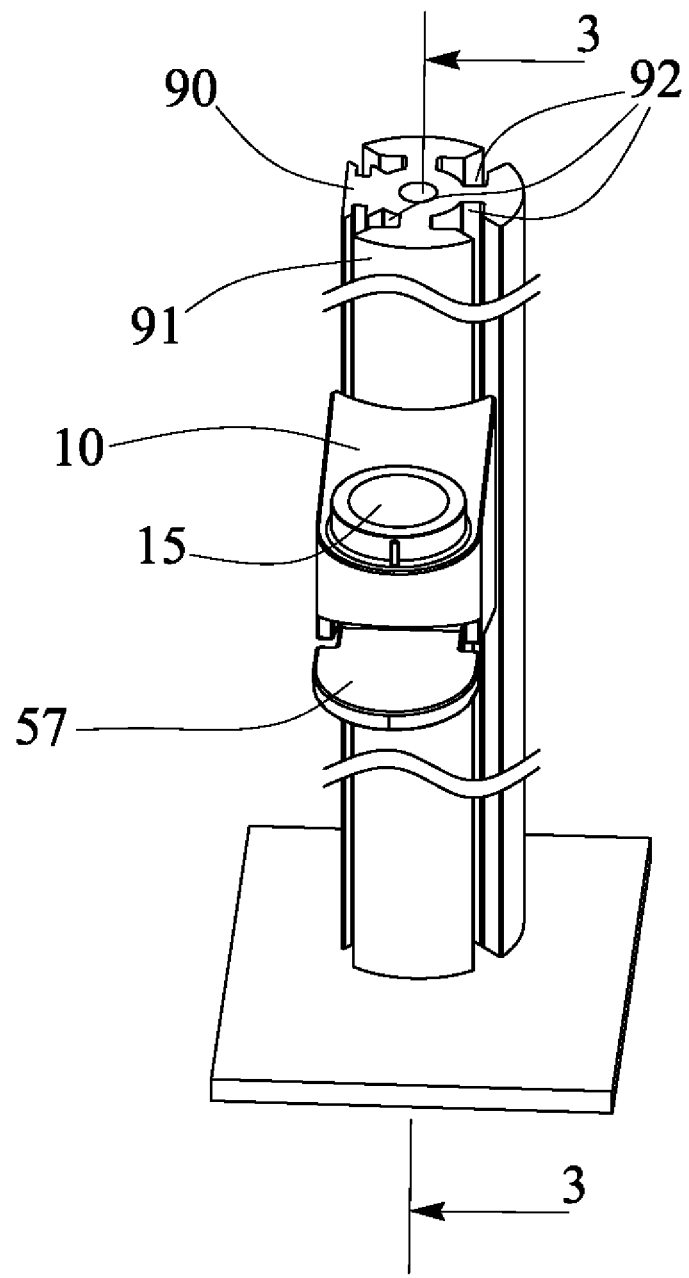
FIG. 1 is a partial perspective view of a positioning clamp or carrier in accordance with the present invention.
Figure 2:
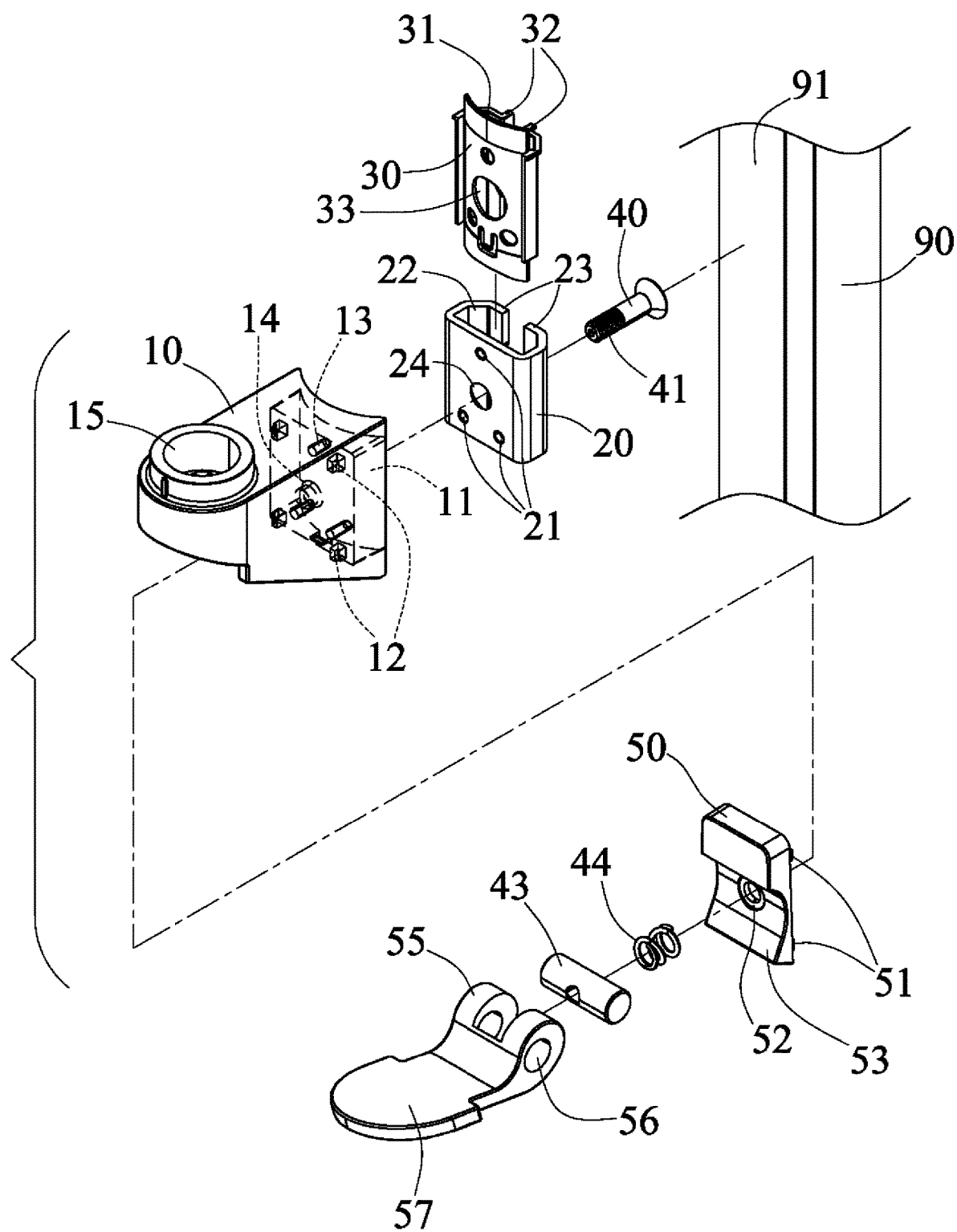
FIG. 2 is a partial exploded view of the positioning clamp or carrier.
Figure 3:
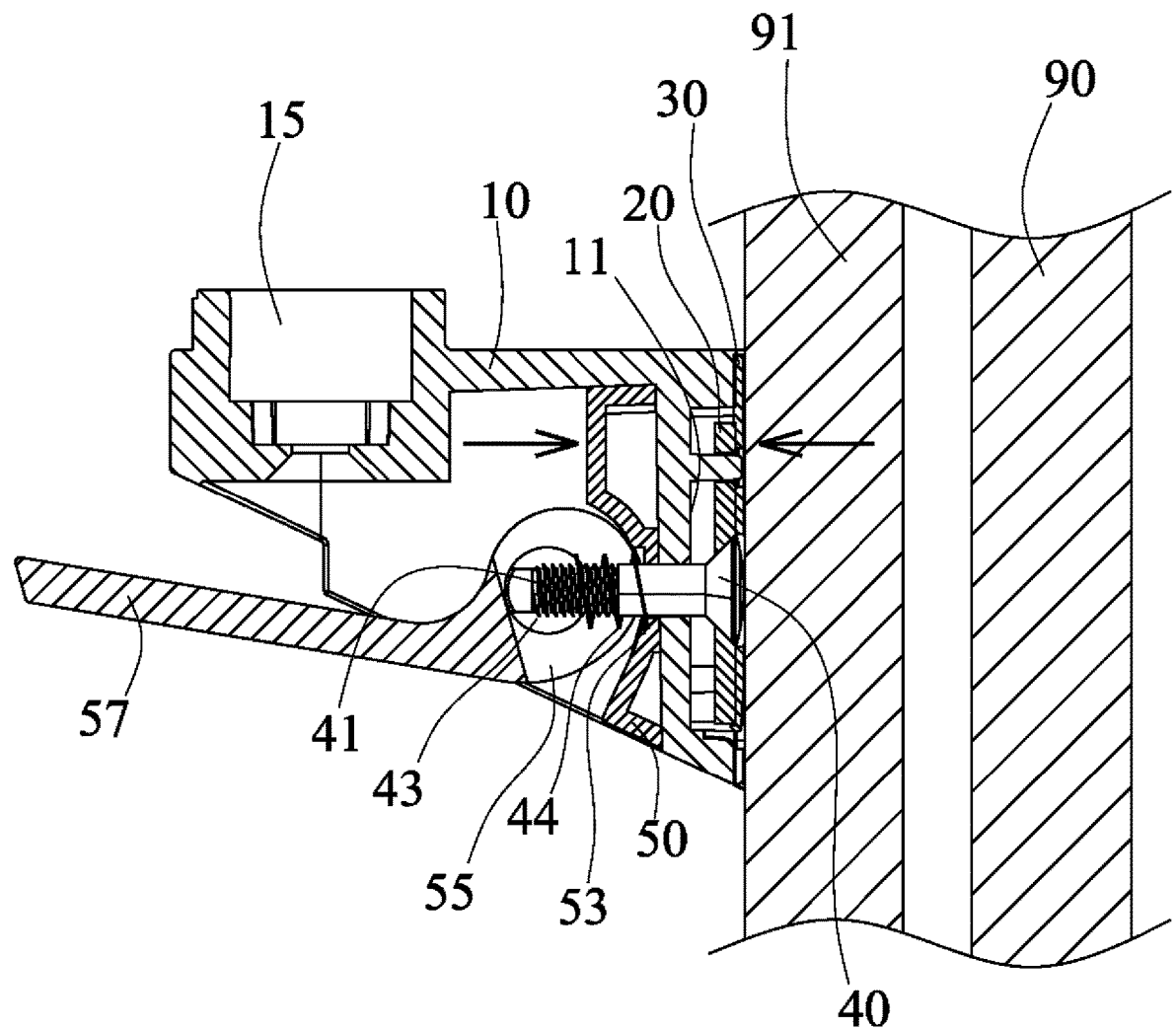
FIG. 3 is a partial cross sectional view of the positioning carrier, taken along lines 3-3 of FIG. 1.

Referring to the drawings, and initially to FIGS. 1-3, a positioning clamp or carrier in accordance with the present invention is developed and provided for attaching or mounting or securing or anchoring or retaining or locking positioning to a vertical track or rail 90 which includes one or more (such as four) vertical tracks or beams or ribs 91 formed or defined by one or more (such as four) passages or slots 92 between the ribs 91, and the positioning carrier comprises a sliding member or seat or housing 10 to be slidably attached or mounted or secured or engaged onto the vertical rail 90 and to be moved up and down along the vertical rail 90 to the selected or predetermined or required position or location.

The housing 10 includes a compartment or chamber 11 formed therein and opened or faced or directed toward the rail 90, and one or more orifices or apertures 12 formed therein and either communicating or not communicating with the chamber 11 of the housing 10, and one or more pins or pegs 13 extended into the chamber 11 of the housing 10, and a hole or bore 14 formed therein and communicating with the chamber 11 of the housing 10, and an opening 15 formed therein and offset or spaced or separated from the chamber 11 of the housing 10 and opened upwardly and downwardly for receiving or engaging with an object (not illustrated) to be carried and supported on the housing 10 selectively.

An anchor or frame 20 is arranged to be attached or mounted or secured to the housing 10, and/or partially engaged into the chamber 11 of the housing 10, and includes one or more apertures or orifices 21 formed therein for receiving or engaging with the pegs 13 of the housing 10 and for anchoring or retaining or positioning the frame 20 to the housing 10 and for preventing the frame 20 from being disengaged or separated from the housing 10, the frame 20 includes a chamber or compartment 22 formed therein and formed or defined by one or more (such as two) flanges or flaps 23 for receiving or engaging with either of the ribs 91 of the rail 90 and for allowing the frame 20 and thus the housing 10 to be moved or slid up and down along or relative to the rail 90, and the frame 20 includes a bore or hole 24 formed therein and aligned with the bore 14 of the housing 10.

A spring biasing member or bracket 30 may further be provided and attached or engaged into the compartment 22 of the frame 20, and frictionally contacted or engaged with the rib 91 of the rail 90 for solidly and stably engaging with and for anchoring or retaining or positioning the frame 20 to the vertical track or rib 91 of the rail 90, the bracket 30 also includes a compartment or space 31 formed therein and formed or defined by one or more (such as two) flaps or flanges 32 for receiving or engaging with the rib 91 of the rail 90 and for allowing the bracket 30 and thus the frame 20 and the housing 10 to be moved or slid along or relative to the rail 90, and the bracket 30 also includes a bore or hole or opening 33 formed therein and aligned with the hole 24 of the frame 20 and the bore 14 of the housing 10, and for receiving or engaging with a lock or fastener or latch 40. The latch 40 includes a threaded segment or member 41 formed or provided thereon.

A follower or seat 50 includes one or more pins or pegs or studs 51 extended therefrom and attached or engaged into or engaged with the apertures 12 of the housing 10 for anchoring or retaining or positioning the seat 50 to the housing 10 and for preventing the seat 50 from being disengaged or separated from the housing 10, the seat 50 includes a hole or passage 52 formed therein and aligned with the hole 24 of the frame 20 and the bore 14 of the housing 10 and the opening 33 of the bracket 30, and for receiving or engaging with the latch 40, and the seat 50 includes a concave or curved surface 53 formed therein and directed or faced away from the housing 10. A lock or shaft 43 is threaded to the threaded segment 41 of the latch 40, and a spring biasing member or spring 44 is engaged onto the latch 40 and engaged between the shaft 43 and the seat 50.

A cam member 55 includes a hole or groove 56 formed therein for receiving or engaging with the shaft 43, and includes a handle or hand grip 57 formed or provided thereon or extended therefrom for actuating or operating or rotating the cam member 55 relative to the seat 50 and the housing 10. The cam member 55 is contacted or engaged with the curved surface 53 of the seat 50 for actuating or forcing the frame 20 and the housing 10 and the seat 50 toward each other (FIGS. 3, 5) and for allowing the frame 20 and the housing 10 to be solidly and stably engaged with and anchored or retained to the rib 91 of the rail 90, or for releasing the frame 20 and the housing 10 and the seat 50 from each other (FIGS. 4, 6) and for allowing the frame 20 and the housing 10 to be moved or slid along or relative to the rail 90.

Figure 5:
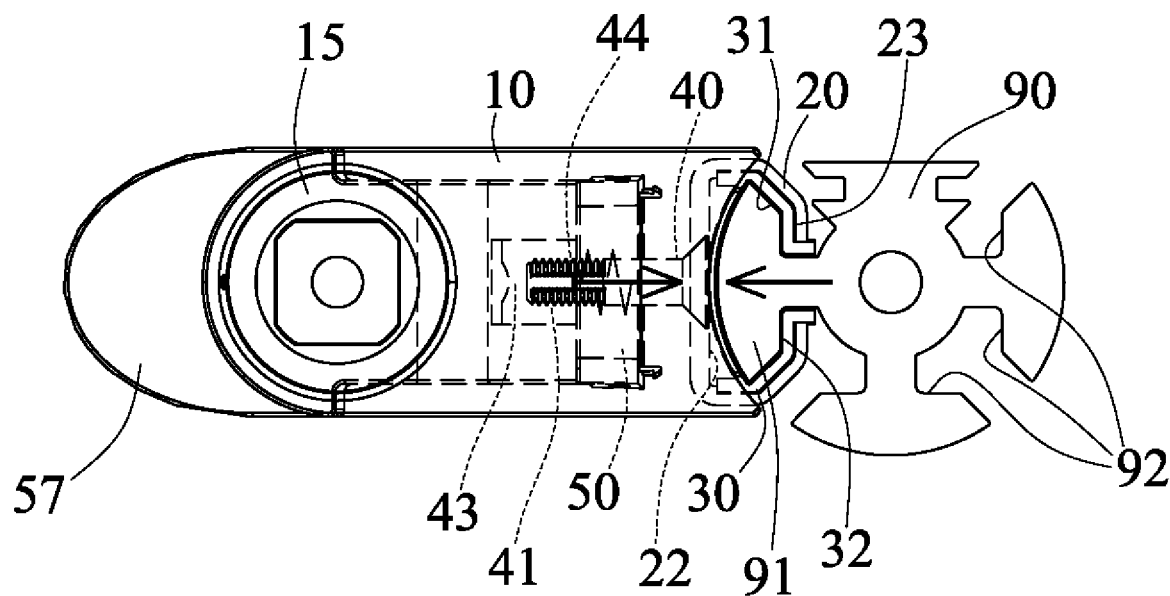
FIG. 5 is a top plan schematic view of the positioning carrier as shown in FIG. 3, illustrating the operation of the positioning carrier.

In operation, as shown in FIGS. 3 and 5, when the cam member 55 is actuated or rotated in one direction relative to the seat 50 and the housing 10, the frame 20 and the housing 10 and the seat 50 may be forced and moved toward each other and may thus force and move the frame 20 and the bracket 30 to engage with the rib 91 of the rail 90 and to solidly and stably anchor or retain the frame 20 and the housing 10 to the rail 90. It is preferable, but not necessary that the latch 40 is contacted or engaged with the frame 20, but not contacted or engaged with the bracket 30 (FIG. 5), and the bracket 30 will be forced to solidly and stably engage with the rib 91 of the rail 90 when the cam member 55 force and move the frame 20 and the housing 10 and the seat 50 toward each other.

Figure 4:
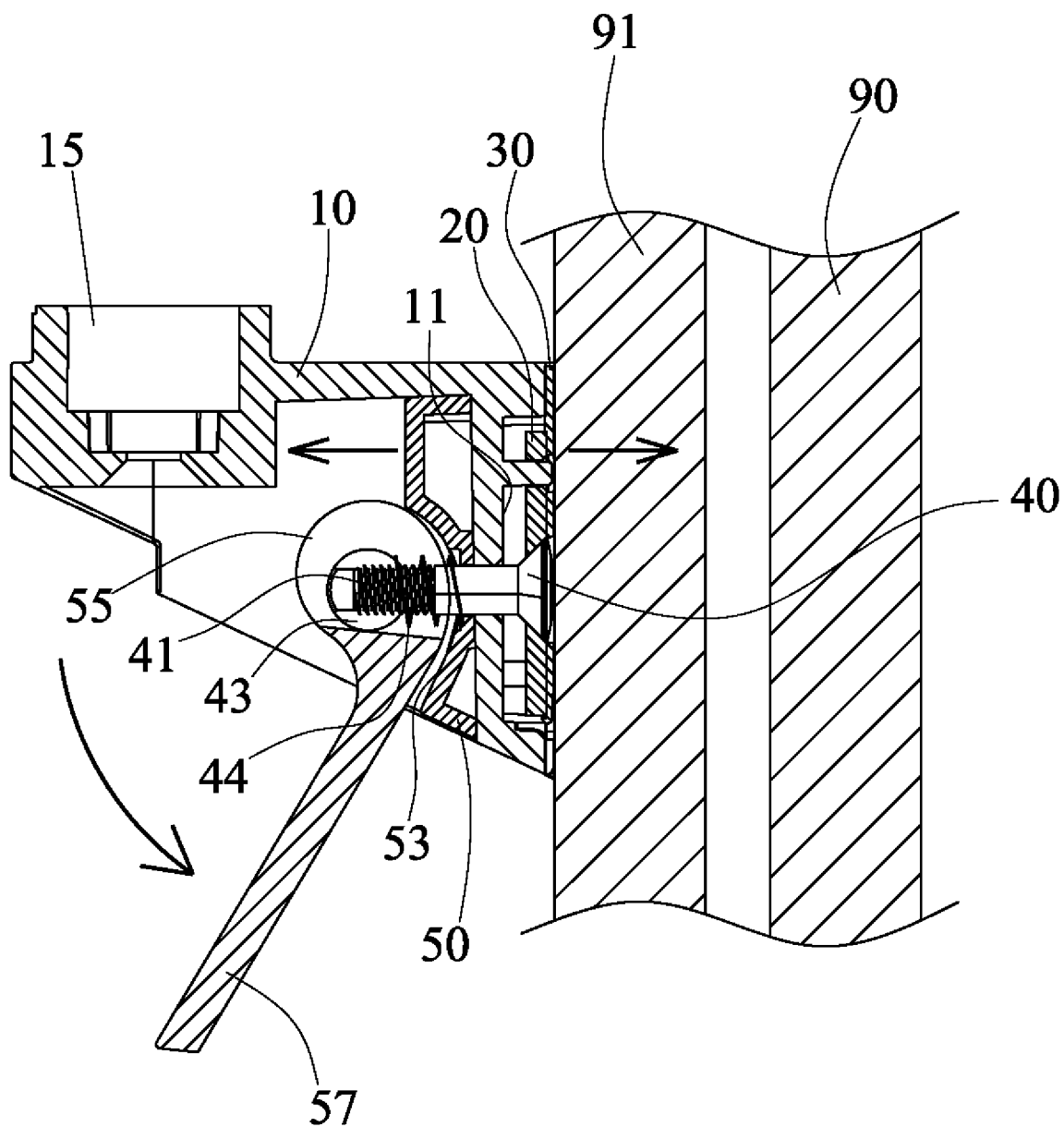
FIG. 4 is another partial cross sectional view similar to FIG. 3, illustrating the operation of the positioning carrier.
Figure 6:
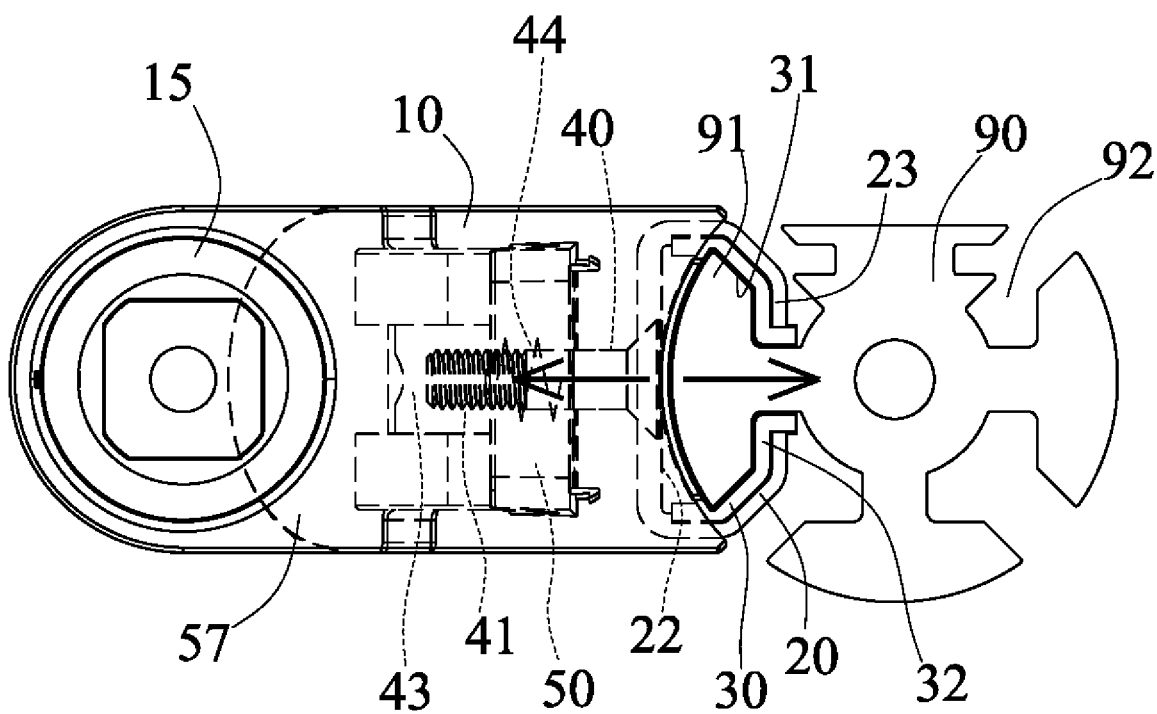
FIG. 6 is another top plan schematic view of the positioning carrier as shown in FIG. 4, illustrating the operation of the positioning carrier.

As shown in FIGS. 4 and 6, when the cam member 55 is actuated or rotated in another direction relative to the seat 50 and the housing 10, the frame 20 and the housing 10 and the seat 50 may be released from each other for allowing the frame 20 and the housing 10 to be moved or slid along or relative to the rail 90 to the selected or predetermined or required position or location.

Accordingly, the positioning carrier in accordance with the present invention includes an improved structure or configuration for solidly and stably attaching or mounting or securing or anchoring or retaining or positioning to a vertical track or rail at the selected or predetermined or required position or location easily and quickly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A positioning carrier for attaching to a rail having a rib, said carrier comprising:
   a housing, said housing including a bore formed in said housing,
   a frame attached to said housing, said frame being engaged onto said rib of said rail and to be moved up and down along said rail, said frame including a compartment formed in said frame for receiving and engaging with said rib of said rail, and said frame including a hole formed in said frame and aligned with said bore of said housing,
   a bracket engaged into said compartment of said frame and contacted and engaged with said rib of said rail,
   a seat attached to said housing, said seat including a passage formed in said seat and aligned with said hole of said frame and said bore of said housing, and said seat including a curved surface formed in said seat,
   a latch engaged through said hole of said frame and said bore of said housing and said passage of said seat,
   a shaft attached to said latch,
   a spring biasing member engaged onto said latch and engaged between said shaft and said seat, and a cam member including a groove formed in said cam member for receiving and engaging with said shaft and for contacting and engaging with said curved surface of said seat, and for actuating and forcing said frame and said housing and said seat toward each other in order to anchor and retain said frame and said housing to said rib of said rail when said cam member is rotated in one direction relative to said seat and said housing, and for releasing said frame and said housing and said seat from each other when said cam member is rotated in another direction relative to said seat and said housing.

2. The positioning carrier as claimed in claim 1, wherein said cam member includes a hand grip for rotating said cam member relative to said seat and said housing.

3. The positioning carrier as claimed in claim 1, wherein said frame includes at least one flap engaged with said rib of said rail.

4. The positioning carrier as claimed in claim 1, wherein said bracket includes at least one flange engaged with said rib of said rail.

5. The positioning carrier as claimed in claim 1, wherein said bracket includes an opening formed in said bracket for receiving and engaging with said latch.

6. The positioning carrier as claimed in claim 1, wherein said latch includes a threaded segment engaged with said shaft.

7. The positioning carrier as claimed in claim 1, wherein said housing includes a chamber formed in said housing for receiving and engaging with said frame.

8. The positioning carrier as claimed in claim 1, wherein said housing includes at least one peg engaged with said frame.

9. The positioning carrier as claimed in claim 1, wherein said bracket includes at least one stud engaged with said housing.

* * * * *